United States Patent
Soderi et al.

(10) Patent No.: US 9,608,742 B2
(45) Date of Patent: Mar. 28, 2017

(54) METHODS AND SYSTEMS FOR SIGNAL FINGERPRINTING

(71) Applicant: GENERAL ELECTRIC COMPANY, Schenectady, NY (US)

(72) Inventors: Simone Soderi, Florence (IT); Mario Luigi Papini, Florence (IT)

(73) Assignee: ALSTOM TRANSPORT TECHNOLOGIES, Levallois Perret (FR)

( * ) Notice: Subject to any disclaimer, the term of this patent is extended or adjusted under 35 U.S.C. 154(b) by 197 days.

(21) Appl. No.: 13/851,248

(22) Filed: Mar. 27, 2013

(65) Prior Publication Data

US 2013/0337856 A1  Dec. 19, 2013

Related U.S. Application Data

(60) Provisional application No. 61/661,205, filed on Jun. 18, 2012.

(51) Int. Cl.
*H04B 5/00* (2006.01)
*H04B 15/02* (2006.01)
*B61L 3/12* (2006.01)

(52) U.S. Cl.
CPC .............. *H04B 15/02* (2013.01); *B61L 3/125* (2013.01); *B61L 2003/123* (2013.01)

(58) Field of Classification Search
CPC ............. B61L 15/0018; B61L 15/0027; B61L 15/0045; B61L 25/02; B61L 3/125; H04B 5/0031; H04B 5/0037

USPC ........ 455/41.1; 340/10.1; 307/104; 320/108; 701/19

See application file for complete search history.

(56) References Cited

U.S. PATENT DOCUMENTS

| | | | |
|---|---|---|---|
| 3,530,434 A | 9/1970 | Stites et al. | |
| 8,405,796 B2 | 3/2013 | Masuda et al. | |
| 2004/0030466 A1 | 2/2004 | Rezk | |
| 2005/0137760 A1* | 6/2005 | Watanabe et al. | 701/19 |
| 2005/0278982 A1* | 12/2005 | Herzog et al. | 37/104 |
| 2007/0141983 A1* | 6/2007 | Shyu et al. | 455/41.1 |
| 2007/0273470 A1* | 11/2007 | Fiz et al. | 340/3.31 |

(Continued)

FOREIGN PATENT DOCUMENTS

| | | |
|---|---|---|
| EP | 1388480 A1 | 2/2004 |
| EP | 2112046 A1 | 10/2009 |
| WO | 2010007822 A1 | 1/2010 |

OTHER PUBLICATIONS

European Search Report and Written Opinion issued in connection with corresponding EP Application No. 13172266.2-1856 dated Oct. 24, 2013.

*Primary Examiner* — Nguyen Vo

(74) *Attorney, Agent, or Firm* — Hahn Loeser & Parks, LLP

(57) ABSTRACT

Systems and methods for modulating a telepowering signal in a downlink communication. Embodiments of the present invention provide a fingerprint module to generate a fingerprint signal that can be modulated with a telepowering signal for communication by a transmission module in a downlink communication. The fingerprint signal is reflected by a wayside equipment module and received by the transmission module to enable an additional communication other than the downlink communication and an uplink communication.

21 Claims, 6 Drawing Sheets

(56) References Cited

U.S. PATENT DOCUMENTS

| | | | |
|---|---|---|---|
| 2009/0254233 A1* | 10/2009 | Noffsinger et al. | 701/20 |
| 2010/0026562 A1* | 2/2010 | Hyodo | G01S 13/04 |
| | | | 342/189 |
| 2011/0063184 A1* | 3/2011 | Furumura | G06K 19/07749 |
| | | | 343/856 |
| 2011/0101788 A1* | 5/2011 | Sun et al. | 307/104 |
| 2011/0164471 A1* | 7/2011 | Baarman et al. | 368/10 |
| 2012/0001593 A1* | 1/2012 | Di Guardo | 320/108 |
| 2012/0173055 A1* | 7/2012 | Yamamoto et al. | 701/20 |
| 2013/0138276 A1* | 5/2013 | Soderi | B61L 3/008 |
| | | | 701/19 |

* cited by examiner

METHODS AND SYSTEMS FOR SIGNAL FINGERPRINTING

CROSS-REFERENCE TO RELATED APPLICATIONS

This application claims the benefit of U.S. Provisional Application Ser. No. 61/661,205, filed Jun. 18, 2012, and entitled "METHODS AND SYSTEMS FOR SIGNAL FINGERPRINTING." The entirety of the aforementioned application is incorporated herein by reference.

BACKGROUND

Technical Field

Embodiments of the subject matter disclosed herein relate to vehicle transmission systems.

Discussion of Art

Vehicle networks have developed as separate and individual networks during different time periods in which varying technology was implemented. This has resulted in difficulties with interoperability based at least in part upon a disconnect between technological capabilities and each vehicle network. In particular, signaling systems and/or automated control systems between vehicle networks lack compatibility.

BRIEF DESCRIPTION

In one embodiment, a method is provided. The method includes establishing a downlink communication between a downlink transmitter and a downlink receiver. The method further includes transmitting a telepowering signal in the downlink communication. The method further includes transmitting a fingerprint signal modulated with the telepowering signal in the downlink communication.

In one embodiment, a system is provided. The system includes a balise transmission module with a downlink wireless transmitter and an uplink wireless receiver. The system further includes a balise with an uplink wireless transmitter and a downlink wireless receiver. The system further includes the balise and the balise transmission module that establish a downlink channel to communicate a first signal and an uplink channel to communicate a second signal. The system further includes the balise transmission module that communicates a third signal modulated with the first signal to the balise with the downlink channel. The system further includes the balise transmission module with a fingerprint receiver that detects the fingerprint signal.

In one embodiment, a system is provided. The system includes a transmission module with at least one transmitter and at least one receiver. The system further includes a wayside equipment module with at least one transmitter and at least one receiver. The system further includes the transmission module that communicates with the wayside equipment module. The system further includes an uplink with a wireless transmission from the wayside equipment module to the transmission module. The system further includes a downlink with a wireless transmission from the transmission module to the wayside equipment module. The system further includes the downlink with a fingerprint signal that is communicated with a telepowering signal from the transmission module to the wayside equipment module and reflected from the wayside equipment module to the transmission module.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
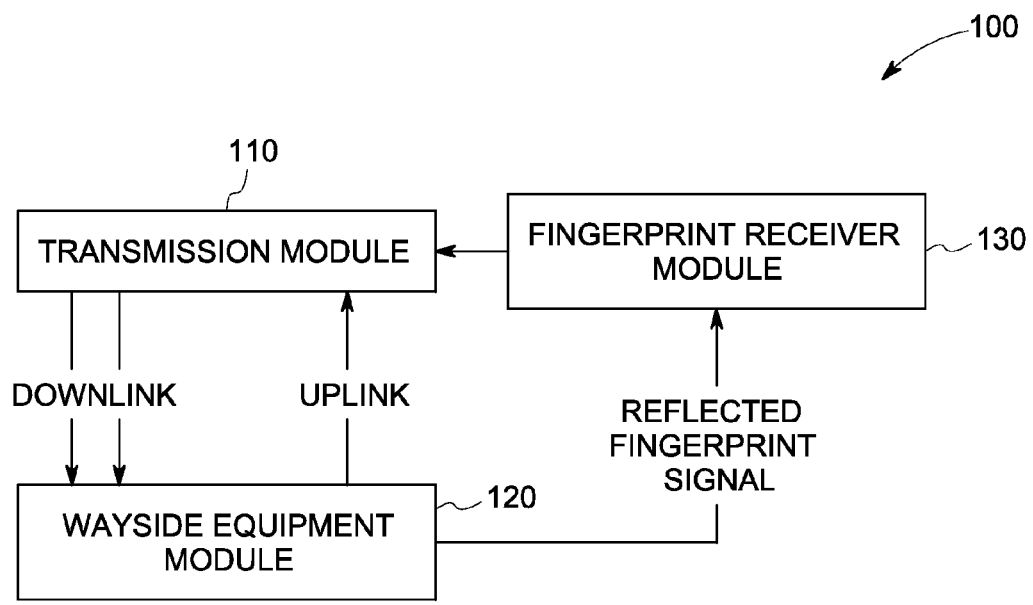
FIG. 1 is an illustration of an embodiment of a system for modulating a telepowering signal in a downlink communication.

Embodiments of the present invention relate to methods and systems for modulating a telepowering signal in a downlink communication. In particular, a generated fingerprint signal can be modulated with a telepowering signal for communication in a downlink communication. The modulated fingerprint signal is reflected and enables additional communications other than the downlink communication and an uplink communication between a transmission module and a wayside equipment module.

With reference to the drawings, like reference numerals designate identical or corresponding parts throughout the several views. However, the inclusion of like elements in different views does not mean a given embodiment necessarily includes such elements or that all embodiments of the invention include such elements.

The term "vehicle" as used herein can be defined as any asset that is a mobile machine that transports at least one of a person, people, or a cargo, or that is configured to be portable from one location to another. For instance, a vehicle can be, but is not limited to being, a locomotive or other rail vehicle, an intermodal container, a marine vessel, a mining equipment, a stationary portable power generation equipment, an industrial equipment, a construction equipment, and the like.

The term "balise" as used herein can be defined as an electronic beacon or transponder for a vehicle on or near a path for the vehicle.

The term "balise transmission module" as used herein can be defined as at least one of a portion of software, a portion of hardware, or a combination thereof that transmits or receives a wireless signal on-board a vehicle.

The term "wayside equipment" as used herein can be defined as at least one of a portion of software, a portion of hardware, or a combination thereof that transmits a wireless signal to a vehicle or receives a wireless signal from a vehicle.

The terms "downlink," "uplink," and "telepowering" (and the various forms thereof) may be used interchangeably herein and refer to a wireless communication from a transmission module to a wayside equipment module or vice versa, respectively, wherein the wireless communication can provide telepowering to the wayside equipment module.

FIG. 1 is an illustration of an embodiment of a system 100 for modulating a telepowering signal in a downlink communication. The system 100 includes a transmission module 110 that communicates with a wayside equipment module 120. The communication between the transmission module 110 can be a wireless communication that includes at least one of an uplink communication ("UPLINK") or a downlink communication ("DOWNLINK") (also referred to as "telepowering"). The downlink communication can be a wireless communication from the transmission module 110 to the wayside equipment module 120, wherein, for instance, the downlink communication telepowers the wayside equipment module 120 via a telepowering signal. Furthermore, the uplink communication can be a wireless communication from the wayside equipment module 120 to the transmission module 110.

The transmission module 110 can generate a fingerprint signal that is modulated with the telepowering signal. The fingerprint signal can include packaged data or information, wherein such information or data is modulated with the telepowering signal during communication within the downlink communication. As depicted in FIG. 1, the downlink communication (also referred to as "DOWNLINK") includes the telepowering signal (indicated by an arrow) and the fingerprint signal (indicated by an arrow). Thus, the downlink communication includes the fingerprint signal modulated with the telepowering signal, wherein the fingerprint signal can include packaged data or information.

The fingerprint signal modulated with the telepowering signal can be selected with at least one particular frequency. In an embodiment, the modulation on the telepowering signal and the fingerprint signal can include a center frequency such that the spectrum is within the telepowering antenna bandwidth. (See FIG. 7). The frequency selection for the modulation allows the modulated signal (e.g., fingerprint signal modulated with the telepowering signal) to be received by the wayside equipment module 120, wherein the wayside equipment module 120 receives the telepowering signal and reflects the fingerprint signal.

The system 100 further includes a fingerprint receiver module 130 that receives the reflected fingerprint signal communicated within the downlink communication. The fingerprint receiver module 130 can be configured to receive frequencies associated with the transmitted fingerprint signal. In other words, the fingerprint module 130 can be configured in connection with the transmission module 110 and at least one frequency utilized to communicate the fingerprint signal modulated with the telepowering signal in the downlink communication. It is to be appreciated that the fingerprint receiver module 130 can be a separate module (as illustrated), incorporated into the transmission module 110, and/or a suitable combination thereof.

In particular, the fingerprint signal can be reflected by the wayside equipment 120 and received by the transmission module 110 when within range for the transmission module 110 to transmit signals (e.g., via inductive transponders) to the wayside equipment 120. In other words, when the transmission module 110 is within a range of the wayside equipment module 120, the fingerprint signal can be reflected and received by the transmission module 110. Thus, such reflected and received signal can be utilized to identify a location for the wayside equipment module 120. The fingerprint signal is a signal technology that minimizes interference with existing wireless signals (e.g., radio signals, etc.) whereas inductive transponders are exposed to interference (e.g., cross-talk, etc.).

The downlink communication includes the telepowering signal transmitted from the transmission module 110 to the wayside equipment module 120. The uplink communication includes a signal transmitted from the wayside equipment module 120 to the transmission module 110. Furthermore, the fingerprint signal transmitted by the transmission module 110 can be reflected by the wayside equipment module 120. The reflected fingerprint signal received at the transmission module 110 can designate a location of the wayside equipment module 120 based upon digital signal analysis (discussed in more detail below).

Typically, inductive transponders provide the uplink communication and/or the downlink communication between the transmission module 110 and the wayside equipment module 120. However, the uplink communication and the downlink communication are managed independently resulting in discontinuity. For instance, a downlink (e.g., telepowering) may not occur for a corresponding uplink (e.g., no transmission from uplink communication). In another example, the telepowering may be delayed resulting in a delayed transmission for the uplink communication. Moreover, inductive transponders provide low accuracy to identify geographic location between a transmitter and receiver as well as potential cross-talk interference with proximate wireless transmissions and/or signals.

With the fingerprint receiver module 130, a fingerprint signal enables an alternative communication path for signaling between the transmission module 110 and the wayside equipment module 120. In other words, the system 100 provides communication for the telepowering signal and the fingerprint signal in the downlink communication as well as any signal(s) in the uplink communication. This fingerprint signal communication minimizes interferences with existing wireless signals as well as provides cross-talk rejection (e.g., rejection of interference from cross-talk). Moreover, the fingerprint signal can be leveraged to optimize wireless communication between the transmission module 110 and the wayside equipment module 120 to identify geographic location(s) (discussed in more detail below).

Figure 2:
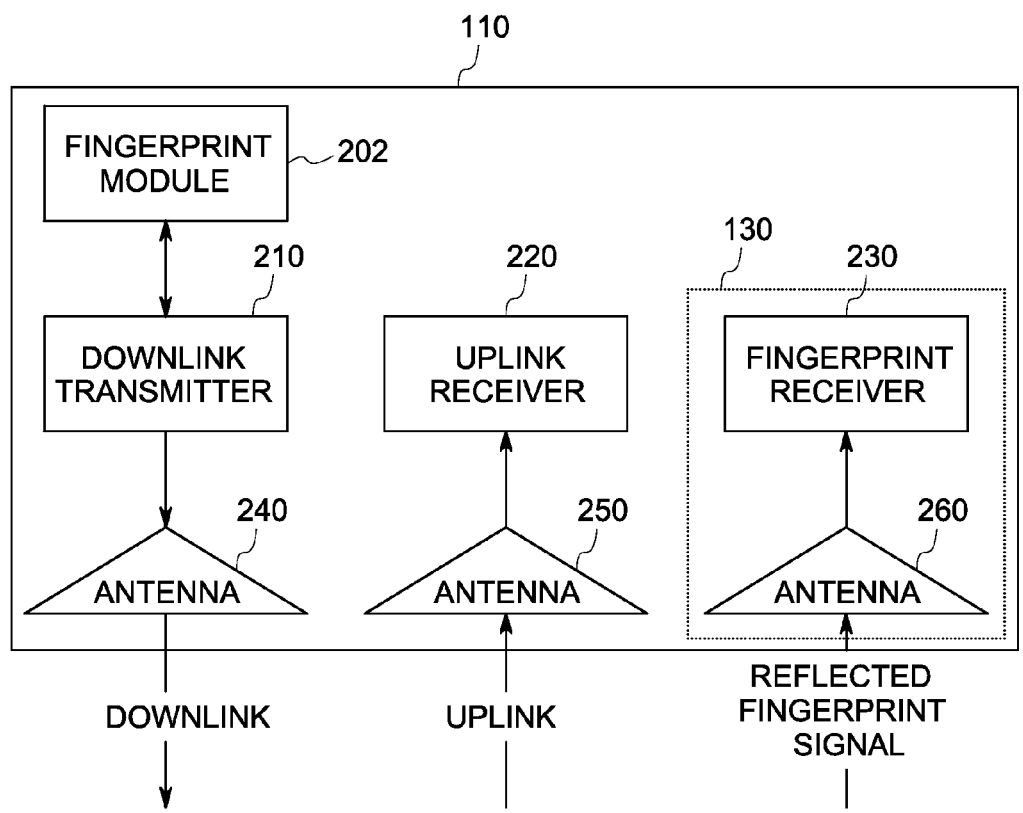
FIG. 2 is an illustration of an embodiment of the transmission module utilized in the system of FIG. 1.

FIG. 2 is an illustration of an embodiment of the transmission module 110. The transmission module 110 includes an uplink receiver 220 and an antenna 250. The uplink receiver 220 can receive an uplink signal via the antenna 250 from the uplink communication (also referred to as "uplink"). Moreover, the uplink receiver 220 can demodulate the uplink signal received via the antenna 250. Additionally, the transmission module 110 includes a downlink transmitter 210 and an antenna 240. The downlink transmitter 210 transmits a telepowering signal via the antenna 240 through the downlink communication (also referred to as "downlink" or "telepowering"). The downlink transmitter 210 can modulate the telepowering signal transmitted via the antenna 240.

The transmission module 110 can be a suitable module that communicates a signal. By way of example and not limitation, the transmission module 110 can be an on-board module, an off-board module, on-board a vehicle module, an on-board an asset module, and/or a suitable combination thereof. In another example, the transmission module 110 can be off-board such as on an exterior of a vehicle, on an exterior of an asset, among others.

Although the transmission module 110 is illustrated with the antenna 260, two or more antenna can be utilized to detect the reflected fingerprint signal. The antenna 260 is depicted as an example and a suitable number of antenna can be employed to detect the reflected fingerprint signal.

The transmission module 110 can include a fingerprint module 202. The fingerprint module 202 can be incorporated into the transmission module 110 (as illustrated), a separate or stand-alone module, and/or a suitable combination thereof. The fingerprint module 202 can create a fingerprint signal. The fingerprint signal can be a suitable signal that can be modulated with the telepowering signal in the downlink communication. By way of example and not limitation, the modulation can be an amplitude modulation. Moreover, a suitable modulation technique can be employed with the subject innovation. In particular, the fingerprint signal can be modulated about a center frequency that is within a spectrum of the downlink communication. By way of example and not limitation, the modulation center frequency of the fingerprint module 202 can be selected such that the spectrum is within the telepowering (e.g., downlink) antenna (e.g., antenna 240) bandwidth. Thus, the modulated fingerprint signal and telepowering signal can be communicated via the downlink communication.

The transmission module 110 depicted in FIG. 2 includes the fingerprint receiver module 130. As discussed, the fingerprint receiver module 130 can be a separate module, incorporated into the transmission module 110 (as illustrated), and/or a suitable combination thereof. The transmission module 110 and/or the fingerprint receiver module 130 can include fingerprint receiver 230 and an antenna 260. The fingerprint receiver 230 can receive a fingerprint signal via the antenna 260. In particular, the antenna 260 and the fingerprint receiver 230 can be configured to receive a signal frequency associated with the fingerprint signal created and communicated in the downlink communication. For instance, the antenna 260 can be configured to receive a frequency selected for the fingerprint signal, wherein such frequency allows communication through the downlink communication but not interfere with the uplink communication and/or other signal(s) or signaling system(s).

Figure 7:
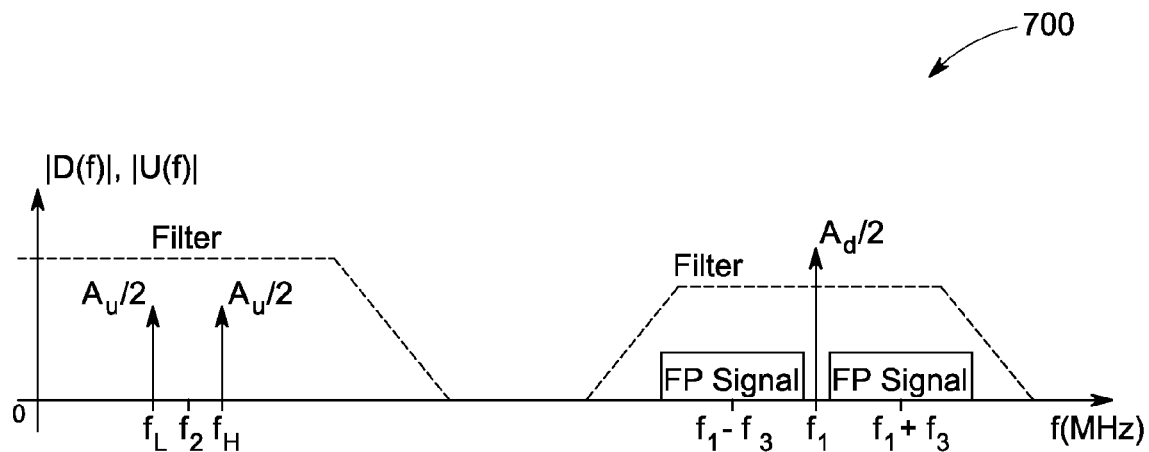
FIG. 7 is a graph of a fingerprint signal in a downlink band.

By way of example and not limitation, the fingerprint receiver 230 and antenna 260 can receive signals within a range of frequencies. In particular, the center frequency can be a spectrum inside a downlink band (e.g., downlink communication) yet not interfering with the uplink communication frequency range(s). Referring to FIG. 7 briefly, a graph 700 of a fingerprint signal in a downlink band is illustrated. The graph 700 depicts the fingerprint signal having a center frequency ($f_1-f_3$ and $f_1+f_3$) that is within the downlink band. This selection of the center frequency allows the fingerprint signal to be transmitted through the downlink communication and reflected from the wayside equipment module to the transmission module 110. As illustrated a downlink communication frequency ($f_1$) can have an amplitude of $A_d/2$. The uplink communication can be centered on $f_2$ and can include a low frequency ($f_L$) and a high frequency ($f_H$), wherein each amplitude is $A_u/2$. A filter that includes the bandwidth of the fingerprint signal (also referred to as FP signal) can be utilized with digital signaling processing techniques in order to recover or receive the fingerprint signal. Thus, the fingerprint signal frequency is selected such that it can be included within a filter as well as not interfere with $f_1$, $f_L$, $f_2$, and/or $f_H$.

In an embodiment, the transmission module 110 can be a balise transmission module. In another embodiment, the transmission module 110 can be a balise transmission module on-board a vehicle (e.g., vehicle balise transmission module). In another embodiment, the transmission module 110 can be a balise transmission module on-board a railway vehicle. In another embodiment, the transmission module 110 is associated with a train protection system such as, for example, an Automatic Train Protection (ATP) system, European Train Control System (ETCS), European Rail Traffic Management System (ERTMS), among others.

Figure 3:
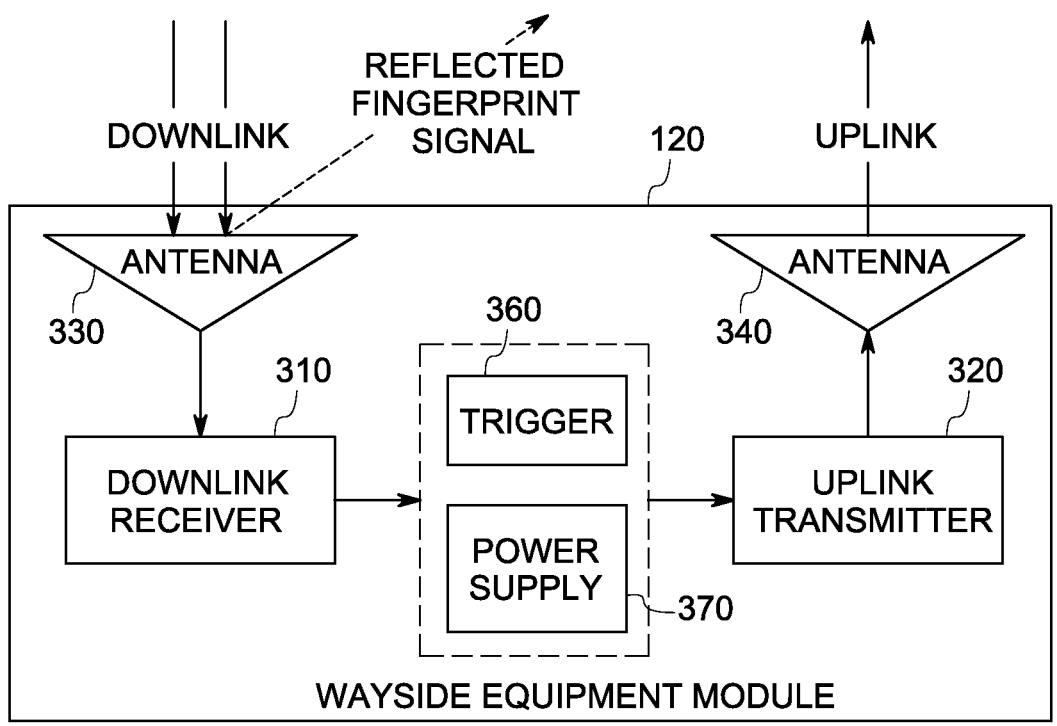
FIG. 3 is an illustration of an embodiment of the wayside equipment module utilized in the system of FIG. 1.

FIG. 3 is an illustration of an embodiment of the wayside equipment module 120. The wayside equipment module 120 includes the downlink communication and the uplink communication. The wayside equipment module 120 includes a downlink receiver 310 and an antenna 330 for the downlink communication. The downlink receiver 310 can receive the telepowering signal via the antenna 340 from the downlink communication (e.g., also referred to as "downlink"). Moreover, the downlink receiver 310 can demodulate the second signal received via the antenna 330.

The downlink communication can include the fingerprint signal and the telepowering signal based at least in part upon the modulation of the two signals. In particular, the downlink communication includes the fingerprint signal and the telepowering signal, wherein the telepowering signal is utilized further as discussed below. The fingerprint signal is reflected from the wayside equipment module 120 back to the transmission module (not shown). The reflection of the fingerprint signal is based at least in part upon the frequency selection for transmission of the telepowering signal and/or the fingerprint signal. Additionally, the reflection of the fingerprint signal can identify a location of the downlink receiver 310 and, in turn, the wayside equipment module 120

The wayside equipment module 120 further includes a trigger 360 and a power supply 370. The power supply 370 can provide power to at least the uplink transmitter 320. In a particular example, the trigger 360 can employ a threshold for an amount of power for at least the uplink transmitter 320. For instance, if the threshold is met by the downlink receiver 310 (e.g., via telepowering from downlink transmitter 320 with the telepowering signal), the power supply 370 can power the uplink transmitter 320.

The transmission module 110 further includes an uplink transmitter 320 and an antenna 340. The uplink transmitter 320 can transmit an uplink signal via the antenna 340 through the uplink communication (also referred to as "uplink"). Moreover, the uplink transmitter 320 can modulate the first signal transmitted via the antenna 340.

In an embodiment, the wayside equipment module 120 can be a balise. In another embodiment, the wayside equipment module 120 can be a wayside equipment for a railway. In another embodiment, the wayside equipment module 120 can be at least one of a switch, a derail, a wayside signal, a rail connection, a switch power cabinet, a track shunt, a track impedance bond, or an insulated joint. In another embodiment, the wayside equipment module 120 can be a balise placed between rails of a railway as part of a train protection system such as, for example, an Automatic Train Protection (ATP) system, European Train Control System (ETCS), European Rail Traffic Management System (ERTMS), among others. In still another example, the wayside equipment module 120 can be any asset associated a train protection system such as, for example, an Automatic Train Protection (ATP) system, European Train Control System (ETCS), European Rail Traffic Management System (ERTMS), among others.

Figure 4:
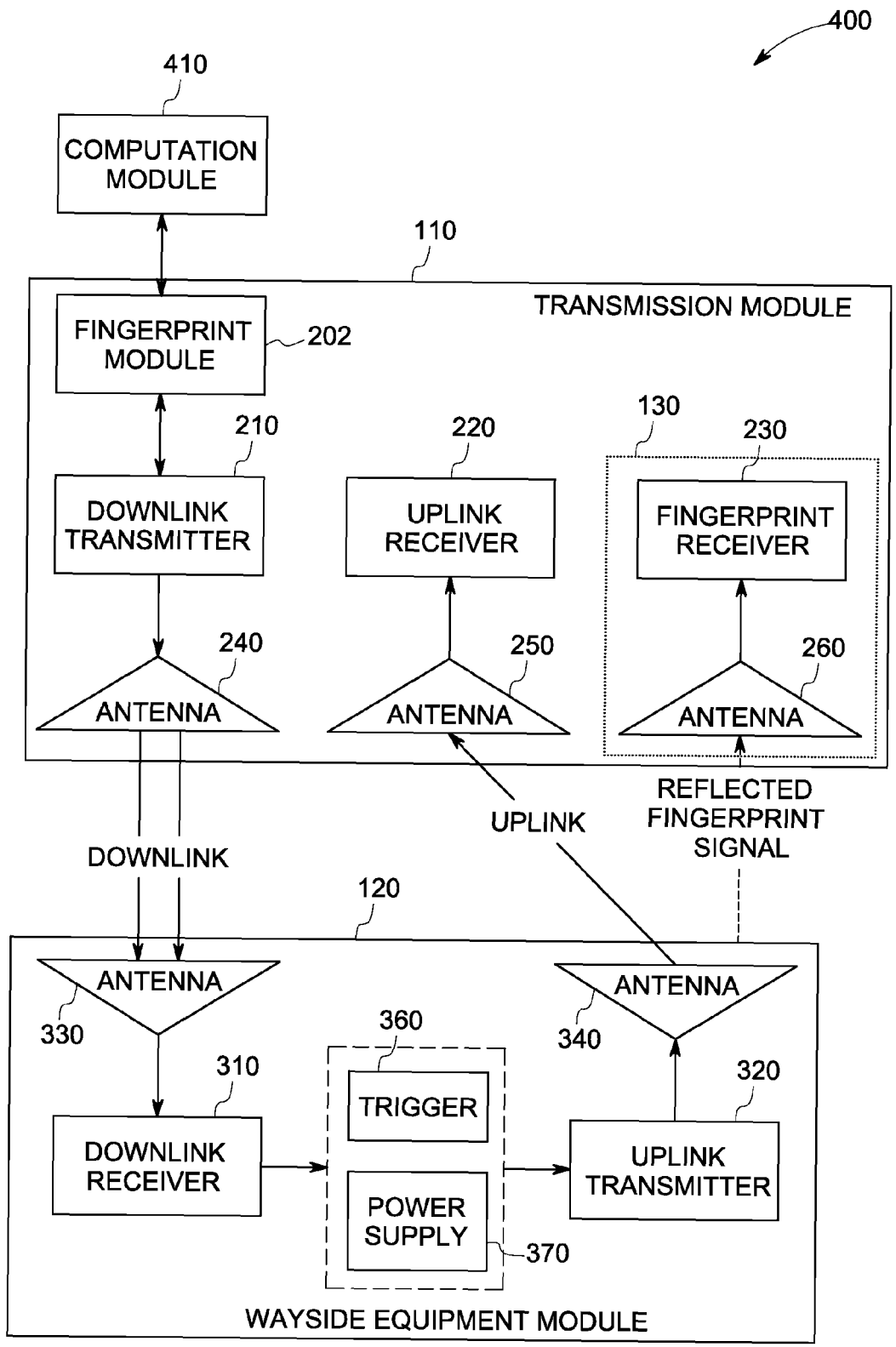
FIG. 4 is an illustration of an embodiment of a system for communicating data with a fingerprint signal modulated with a telepowering signal in a downlink communication.

FIG. 4 is an illustration of an embodiment of a system 400 for communicating data with a fingerprint signal modulated with a telepowering signal in a downlink communication. The system 400 includes the transmission module 110 that communicates with the wayside equipment module 120 utilizing the downlink communication, the uplink communication, and the fingerprint signal. The uplink signal can be transmitted from the uplink transmitter 320 via the antenna 340 and received by the uplink receiver 220 via the antenna 250. The telepowering signal can be transmitted by the downlink transmitter 210 via the antenna 240 and received by the downlink receiver 310 via the antenna 330. Furthermore, the fingerprint signal can be created by the fingerprint module 202 and modulated with the telepowering signal for transmission by the downlink transmitter 210 via the antenna 240. The fingerprint module 202 can create the fingerprint signal to include information, data, and the like. Moreover, the fingerprint signal can be centered about a particular range of frequencies as discussed above. The fingerprint signal transmitted by the downlink transmitter 210 via the antenna 240 is reflected from the wayside equipment module 120. The transmission module 110 further includes the fingerprint receiver module 130 which can include the fingerprint receiver 230 that receives fingerprint signal via the antenna 260. The fingerprint receiver 230 and/or the antenna 260 can be configured to receive a range of frequencies associated with the transmitted fingerprint signal.

The system 400 further includes a computation module 410 that can evaluate the signals (from the uplink communication, from reflection, etc.). In particular, the computation module 410 can include Digital Signal Processing Analysis (DSPA) in order to evaluate the uplink signal and/or the fingerprint signal. The computation module 410 can further control a vehicle based upon the communications. The computation module 410 can be a separate module (as illustrated), incorporated into the transmission module 110, and/or a suitable combination thereof.

Figure 5:
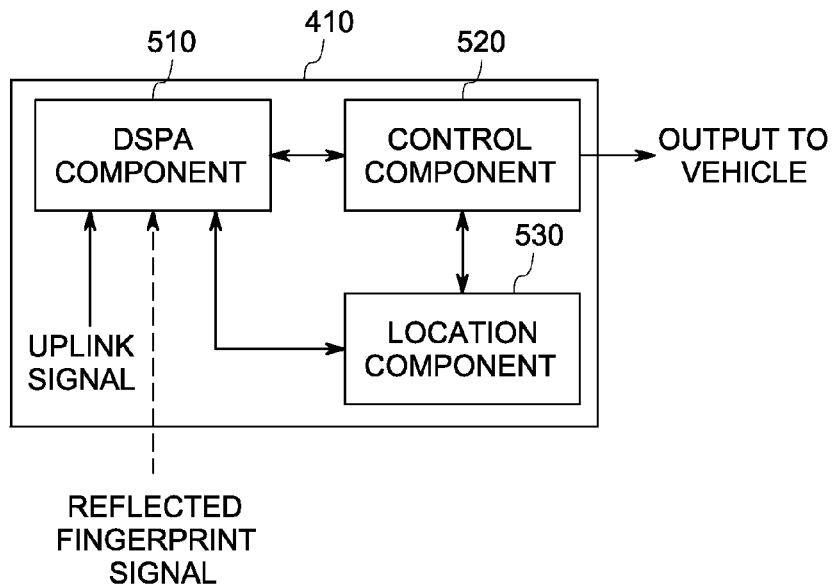
FIG. 5 is an illustration of an embodiment of the computation module utilized in the system of FIG. 4.

FIG. 5 is an illustration of an embodiment of the computation module 410. The computation module 410 includes a Digital Signal Processing Analysis (DSPA) component 510 that employs DSPA for the uplink signal received via the uplink communication and/or the fingerprint signal received via reflection. The DSPA component 410 is described in further detail in FIG. 6. A location component 530 utilizes at least one of the uplink signal and/or the fingerprint signal to identify a geographic location. In particular, the uplink signal can be utilized to provide a geographic location or utilized to calculate a geographic location. The location component 530 can further utilize the fingerprint signal to adjust the calculated geographic location. For instance, the receipt of the fingerprint signal can correspond to a location of a downlink transmitter or in general, a wayside equipment module based upon the reflected signal which can provide a more accurate geographic location.

The computation module 410 can further include a control component 520 that provide a control to at least one of a driver of the vehicle (e.g., notification, message, etc.) or the vehicle (e.g., automated control of the vehicle). In general, the control component 520 outputs data to a vehicle based upon the location component 530 and/or the DSPA component 510. By way of example and not limitation, the output can be a notification (e.g., telegram) for a driver. In still another example, the control component 520 can notify a driver with a notification indicating at least one of a geographic location, an indication of an upcoming change in direction for a route, an upcoming change in elevation for a route, an adjustment to a route a vehicle travels, an adjustment to a trajectory (e.g., speed, brake, acceleration, etc.) of a vehicle, an emergency message (e.g., an upcoming issue/problem on a route, a wreck, etc.). In another instance, the output can be a control for a vehicle such as, but not limited to, a speed adjustment, a speed, a brake, an acceleration, etc.

By way of example and not limitation, the communication between the transmission module and the wayside equipment module can be related to identifying a geographic location for a vehicle, wherein the vehicle includes the transmission module on-board and the wayside equipment module is a balise. The fingerprint signal can be identified and unpacked by the computation module 410 by DSPA, wherein the unpacking of data within the fingerprint signal can provide, for example, a more accurate identification of the geographic location for the balise and, in turn, the vehicle. For example, the uplink signal can include geographic location information, yet such information can be inaccurate due to technological deficiencies of inductive transponders (discussed above). The computation module 410 can identify receipt of the fingerprint signal which corresponds to a location for a balise. In another example, the fingerprint signal can include data that identifies a geographic location for such balise. Thus, the fingerprint signal can be utilized to adjust the geographic location provided/determined by the uplink signal. In other words, receipt of the fingerprint signal (reflected and received) can indicate proximity to a balise and thus a location for such balise. The fingerprint signal communication provides geographic location with cross-talk rejection as well as minimal interference with signals in the environment.

Figure 6:
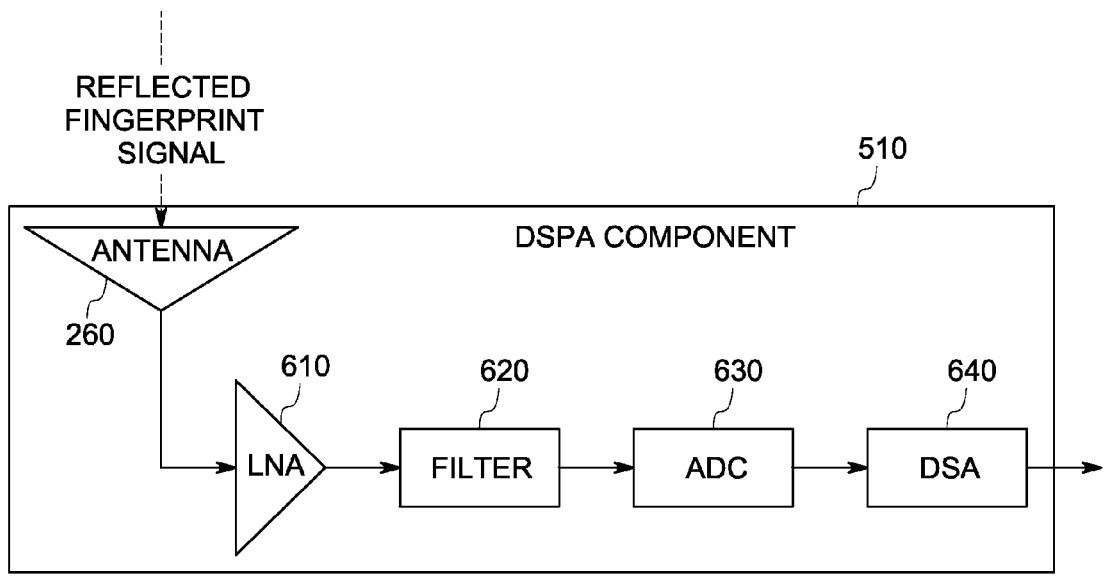
FIG. 6 is an illustration of an embodiment of the DSPA module utilized in the system of FIG. 5.

FIG. 6 is an illustration of an embodiment of the Digital Signal Processing Analysis (DSPA) module 510. The DSPA module 510 can include the antenna 260 (see FIG. 2). The antenna 260 can receive the reflected fingerprint signal via reflection from the downlink communication. The fingerprint signal can be passed through a low noise amplifier 610 and subsequently a filter 620. The filtered fingerprint signal can be passed to an Analog-to-Digital Converter (ADC) 630. Once the fingerprint signal is converted, a digital signal analysis (DSA) 640 is performed to detect the wayside equipment module.

The DSPA component 510 is an exemplary digital signal processing that can be utilized with the fingerprint signal and it is to be appreciated and understood that a suitable digital signal processing can be utilized in order to identify receipt of the fingerprint signal, unpack data within the fingerprint signal, and/or a suitable combination thereof.

The aforementioned systems, modules (e.g., transmission module, wayside equipment module, systems 100, 200, etc.), and the like have been described with respect to interaction between several modules, components, and/or elements. It should be appreciated that such modules and elements can include those elements or sub-elements specified therein, some of the specified elements or sub-elements, and/or additional elements. Further yet, one or more elements and/or sub-elements may be combined into a single component or single module to provide aggregate functionality. The elements may also interact with one or more other elements not specifically described herein for the sake of brevity, but known by those of skill in the art.

Figure 8:
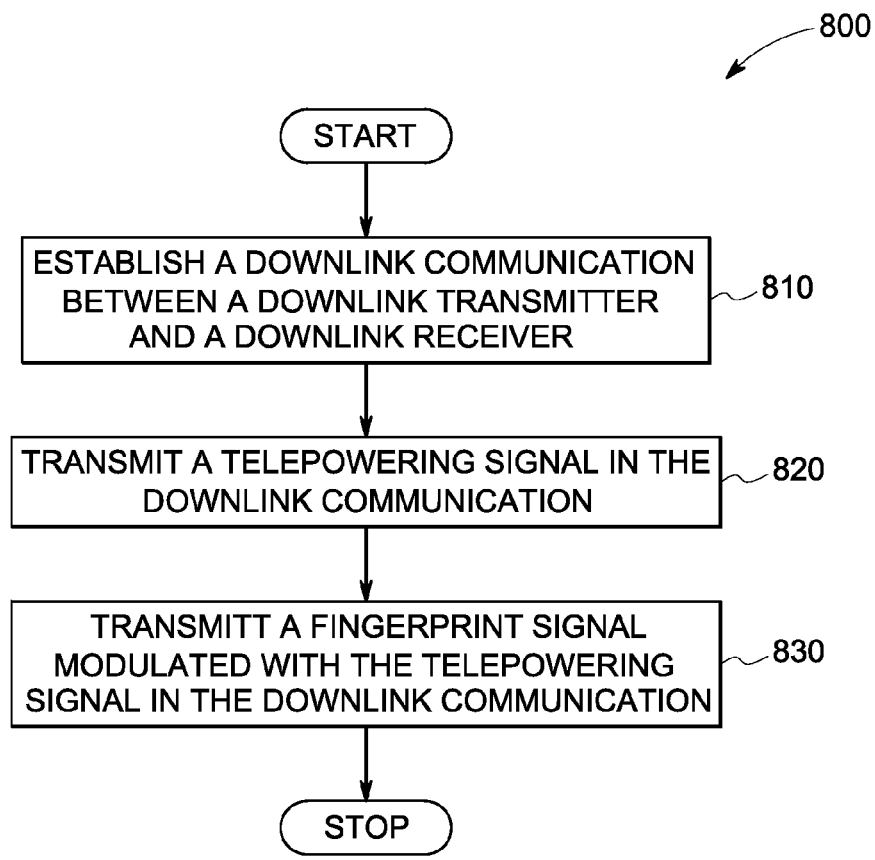
FIG. 8 is a flow chart of an embodiment of a method for modulating a telepowering signal in a downlink communication.
Figure 9:
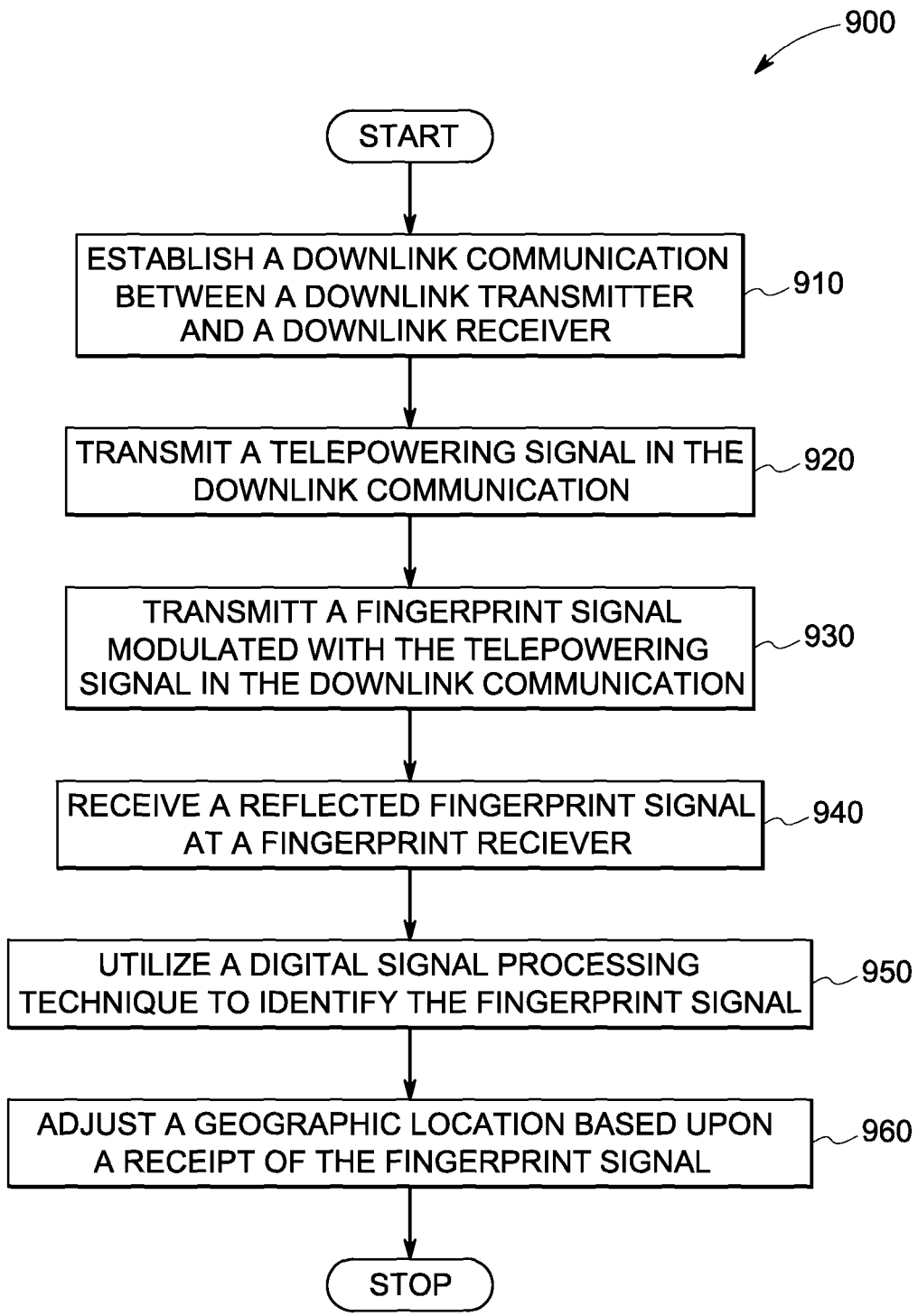
FIG. 9 is a flow chart of an embodiment of a method for adjusting a geographic location based upon a communicated fingerprint signal.

In view of the exemplary devices and elements described supra, methodologies that may be implemented in accordance with the disclosed subject matter will be better appreciated with reference to the flow charts of FIGS. 8-9. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 8 illustrates a flow chart of a method 800 for modulating a telepowering signal in a downlink communication. At reference numeral 810, a downlink communication between a downlink transmitter and a downlink receiver can be established. At reference numeral 820, a telepowering signal can be transmitted in the downlink communication. At reference numeral 830, a fingerprint signal can be modulated and transmitted with the telepowering signal in the downlink communication.

By way of example and not limitation, the uplink communication and the downlink communication can be associated with a transmission module and a wayside equipment module. In another example, the uplink communication and the downlink communication can be between a vehicle balise transmission module and a balise. Yet, the uplink communication and the downlink communication can be between a suitable on-board vehicle and wayside equipment. Moreover, the fingerprint signal reduces an amount of interference with an existing radio signal. Additionally, cross-talk rejection can be employed between the fingerprint signal and any disparate wireless communication based upon the use of the fingerprint signal.

FIG. 9 illustrates a flow chart of a method 900 for adjusting a geographic location based upon a communicated fingerprint signal. At reference numeral 910, a downlink communication can be established between a downlink transmitter and a downlink receiver. At reference numeral 920, a telepowering signal can be transmitted in the downlink communication.

At reference numeral 930, a fingerprint signal modulated with the telepowering signal can be transmitted in the downlink communication. At reference numeral 940, a reflected fingerprint signal can be received at a fingerprint receiver. For instance, the reflected fingerprint signal can correspond to the transmitted fingerprint signal and is reflected from the wayside equipment module.

At reference numeral 950, a digital signaling processing technique can be utilized to identify the fingerprint signal.

At reference numeral 960, a geographic location calculation can be adjusted based upon the receipt of the fingerprint signal. For example, a geographic location can be communicated or identified based upon an uplink signal from an uplink communication. Moreover, this geographic location can be adjusted based upon the fingerprint signal, and in particular, the time and location of a receipt of the fingerprint signal.

For instance, the geographic data can be a suitable data that can be utilized to identify a geographic position. In another embodiment, the method 900 can include communicating data through the fingerprint signal related to an indication of an upcoming change in direction for a route. For example, the data can include an upcoming change in direction such as a left turn, a right turn, a series of turns, a combination of a left turn and a right turn, etc.). The method 900 can further include communicating data through the fingerprint signal related to an indication of an upcoming change in elevation for a route. For example, the change in elevation can be uphill, downhill, a banked turn, etc. The method 900 can further include triggering an adjustment to a route a vehicle travels based upon the fingerprint signal. For instance, a transfer from one route to another route can be employed for a vehicle. By way of example and not limitation, the route change can be for a vehicle to switch from one railway line to another railway line via a switch.

The method 900 can further include employing cross-talk rejection between the downlink communication and a signal from a disparate communication, the downlink communication includes at least the telepowering signal and the fingerprint signal. Moreover, the method 900 can include modulating the fingerprint signal with the telepowering signal with a suitable modulation technique (e.g., amplitude modulation, etc.). The method 900 further includes selecting a frequency for the modulation within a telepowering antenna bandwidth and/or reflecting the fingerprint signal to the downlink transmitter based upon the selected frequency.

The method 900 can further include packaging data within the fingerprint signal, wherein the data can be a suitable data associated with an Automatic Train Protection (ATP) system, European Train Control System (ETCS), European Rail Traffic Management System (ERTMS), among others. The method can further unpack the packaged data and utilized such data accordingly. Moreover, the method 900 includes identifying a geographic location for the downlink receiver based upon receipt of the fingerprint signal.

In an embodiment, a method can be provided that includes at least the steps of establishing a downlink communication between a downlink transmitter and a downlink receiver; transmitting a telepowering signal in the downlink communication; and transmitting a fingerprint signal modulated with the telepowering signal in the downlink communication. In the embodiment, the fingerprint signal includes data for identifying a geographic location. In the embodiment, the downlink communication is from a vehicle balise transmission module to a balise. In the embodiment, the fingerprint signal reduces an amount of interference with an existing radio signal associated with at least one of the balise or the vehicle balise transmission module relative to the existing radio signal when the fingerprint signal is not transmitted.

In an embodiment, the method can further include employing cross-talk rejection between the downlink communication and a signal from a disparate communication. In an embodiment, the method can further include receiving the fingerprint signal. In an embodiment, the method can further include receiving the fingerprint signal and the telepowering signal. In an embodiment, the method can further include modulating the fingerprint signal with the telepowering signal to combine the fingerprint signal with the telepowering signal used for transmission.

In an embodiment, the method can further include selecting a frequency for the modulation within a telepowering antenna bandwidth. In an embodiment, the method can further include reflecting the fingerprint signal to the downlink transmitter based upon the selected frequency. In an embodiment, the method can further include calculating a geographic location for a vehicle based upon a signal received via an uplink communication and adjusting the calculated geographic location based upon the fingerprint signal. In an embodiment, the method can further include communicating geographic data within a signal received via an uplink communication and utilizing the fingerprint signal to adjust a geographic location identified via the communicated geographic data.

In an embodiment, the method can further include identifying a geographic location for the downlink receiver based upon receipt of the fingerprint signal. In an embodiment, the method can further include packaging data in the fingerprint signal. In an embodiment, the method can further include utilizing a digital signal analysis technique to unpack the data in the fingerprint signal. In an embodiment, the method can further include adjusting a trajectory of a vehicle based upon the fingerprint signal and a signal received via an uplink communication.

In an embodiment, a system can be provided that includes a balise transmission module that includes a downlink wireless transmitter and an uplink wireless receiver and a balise that includes an uplink wireless transmitter and a downlink wireless receiver. The balise and the balise transmission module are configured to establish a downlink channel to communicate a first signal and an uplink channel to communicate a second signal. The balise transmission module is configured to communicate a third signal modulated with the first signal to the balise with the downlink channel and the balise transmission module includes a fingerprint receiver that detects a fingerprint signal.

In an embodiment, the system can include a first component configured to calculate a geographic location for a vehicle based upon the second signal and a second component configured to modify the calculated geographic location based upon the third signal. In an embodiment, the system can include a third component configured to adjust a trajectory of a vehicle based upon the third signal and the second signal received at the balise transmission module.

In an embodiment, a system is provided that can include a transmission module that includes at least one first transmitter and at least one first receiver. The transmission module is configured for communication with a wayside equipment module that includes at least one second transmitter and at least one second receiver. The communication includes an uplink that includes a first wireless transmission from the wayside equipment module to the transmission module and a downlink that includes a second wireless transmission from the transmission module to the wayside equipment module. The downlink includes a fingerprint signal that is communicated with a telepowering signal from the transmission module to the wayside equipment module and reflected from the wayside equipment module to the transmission module.

In an embodiment, a system is provided that includes a wayside equipment module that includes at least one second transmitter and at least one second receiver. The wayside equipment module is configured for communication with a transmission module that includes at least one first transmitter and at least one first receiver. The communication can include an uplink that includes a first wireless transmission from the wayside equipment module to the transmission module and a downlink that includes a second wireless transmission from the transmission module to the wayside equipment module. The downlink includes a fingerprint signal that is communicated with a telepowering signal from the transmission module to the wayside equipment module and reflected from the wayside equipment module to the transmission module.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, any use of the terms "first," "second," etc., do not denote any order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A method, comprising:
   establishing a downlink communication between a downlink transmitter and a downlink receiver;
   the downlink transmitter transmitting a telepowering signal in the downlink communication;
   the downlink transmitter transmitting a fingerprint signal modulated with the telepowering signal in the downlink communication; and
   the downlink receiver reflecting the fingerprint signal to the downlink transmitter;
   wherein the step of reflecting the fingerprint signal comprises changing a path of the fingerprint signal when the fingerprint signal encounters a surface of the downlink receiver.

2. The method of claim 1, wherein the fingerprint signal includes data for identifying a geographic location.

3. The method of claim 1, wherein the downlink communication is from a vehicle balise transmission module to a balise.

4. The method of claim 3, wherein the fingerprint signal reduces an amount of interference with an existing radio signal associated with at least one of the balise or the vehicle balise transmission module relative to the existing radio signal when the fingerprint signal is not transmitted.

5. The method of claim 1, further comprising employing cross-talk rejection between the downlink communication and a signal from a disparate communication.

6. The method of claim 1, further comprising receiving the reflected fingerprint signal with a fingerprint receiver.

7. The method of claim 1, further comprising receiving the reflected fingerprint signal with a fingerprint receiver and the telepowering signal with the downlink receiver.

8. The method of claim 1, further comprising modulating the fingerprint signal with the telepowering signal to combine the fingerprint signal with the telepowering signal used for transmission.

9. The method of claim 8, further comprising selecting a frequency for the modulation within a telepowering antenna bandwidth.

10. The method of claim 9, further comprising reflecting where the reflected fingerprint signal to the downlink transmitter is based upon the selected frequency.

11. The method of claim 1, further comprising:
calculating a geographic location for a vehicle based upon a signal received via an uplink communication; and
adjusting the calculated geographic location based upon the fingerprint signal.

12. The method of claim 1, further comprising:
communicating geographic data within a signal received via an uplink communication; and
utilizing the fingerprint signal to adjust a geographic location identified via the communicated geographic data.

13. The method of claim 1, further comprising identifying a geographic location for the downlink receiver based upon receipt of the fingerprint signal.

14. The method of claim 1, further comprising packaging data in the fingerprint signal.

15. The method of claim 14, further comprising utilizing a digital signal analysis technique to unpack the data in the fingerprint signal at a computation module adapted to evaluate the reflected fingerprint signal after the reflected fingerprint signal being received by a fingerprint receiver.

16. The method of claim 1, further comprising adjusting a trajectory of a vehicle based upon the fingerprint signal and a signal received via an uplink communication.

17. A system, comprising:
a balise transmission module that includes a downlink wireless transmitter and an uplink wireless receiver; and
a balise that includes an uplink wireless transmitter and a downlink wireless receiver;
wherein the balise and the balise transmission module are configured to establish a downlink channel to communicate a first signal and an uplink channel to communicate a second signal;
wherein the balise transmission module is configured to communicate a third signal modulated with the first signal to the balise with the downlink channel the third signal comprising a fingerprint signal;
wherein the balise reflects the fingerprint signal by changing a path of the fingerprint signal when the fingerprint signal encounters a surface of the balise; and
the balise transmission module includes a fingerprint receiver that detects a fingerprint signal from the third signal reflected from the balise.

18. The system of claim 17, further comprising:
a first component configured to calculate a geographic location for a vehicle based upon the second signal; and
a second component configured to modify the calculated geographic location based upon the third signal.

19. The system of claim 17, further comprising a third component configured to adjust a trajectory of a vehicle based upon the third signal and the second signal received at the balise transmission module.

20. A system, comprising:
a transmission module that includes at least one first transmitter and at least one first receiver;
wherein the transmission module is configured for communication with a wayside equipment module that includes at least one second transmitter and at least one second receiver, and wherein the communication includes:
an uplink that includes a first wireless transmission from the wayside equipment module to the transmission module;
a downlink that includes a second wireless transmission from the transmission module to the wayside equipment module; and
the downlink includes a fingerprint signal that is communicated with a telepowering signal from the transmission module to the wayside equipment module and reflected from the wayside equipment module to the transmission module;
wherein the wayside equipment module reflects the fingerprint signal by changing a path of the fingerprint signal when the fingerprint signal encounters a surface of the wayside equipment module.

21. A system, comprising:
a wayside equipment module that includes at least one second transmitter and at least one second receiver;
wherein the wayside equipment module is configured for communication with a transmission module that includes at least one first transmitter and at least one first receiver; and
wherein the communication includes:
an uplink that includes a first wireless transmission from the wayside equipment module to the transmission module;
a downlink that includes a second wireless transmission from the transmission module to the wayside equipment module; and
the downlink includes a fingerprint signal that is communicated with a telepowering signal from the transmission module to the wayside equipment module and reflected from the wayside equipment module to the transmission module;
wherein the wayside equipment module reflects the fingerprint signal by changing a path of the fingerprint signal when the fingerprint signal encounters a surface of the wayside equipment module.

* * * * *